United States Patent [19]
Haren et al.

[11] Patent Number: 6,128,691
[45] Date of Patent: Oct. 3, 2000

[54] APPARATUS AND METHOD FOR TRANSPORTING INTERRUPTS FROM SECONDARY PCI BUSSES TO A COMPATIBILITY PCI BUS

[75] Inventors: Ken C. Haren, Hillsboro; Ling Cen, Portland, both of Oreg.

[73] Assignee: Intel Corporation, Santa Clara, Calif.

[21] Appl. No.: 09/164,087

[22] Filed: Sep. 30, 1998

[51] Int. Cl.$^7$ .................................................. G06F 13/24
[52] U.S. Cl. ...................... 710/260; 710/261; 710/266; 710/268; 710/128; 710/129; 710/48
[58] Field of Search ............................. 710/129, 48, 260, 710/261, 266, 126, 128, 58, 60, 61, 45, 268, 264, 265; 711/167, 202

[56] References Cited

U.S. PATENT DOCUMENTS

5,535,420  7/1996  Kardach et al. ........................... 710/48

*Primary Examiner*—Ario Etienne
*Attorney, Agent, or Firm*—Blakely, Sokoloff, Taylor & Zafman LLP

[57] ABSTRACT

During the boot of a computer system, IRQs from peripheral components located on secondary PCI busses must be transported to the interrupt controller on the compatibility PCI bus for communication to central processing units (CPUs). According to the invention, these IRQs are detected by a Secondary Interrupt Mapping (SIM) device which transports the signals according to a 2 bit bus protocol over a wired-"OR" bus structure to a Primary Interrupt Mapping (PIM) device located on the compatibility PCI bus. The PIM and SIM transport IRQs over the bus structure utilizing a timing sequence and 2-bit bus protocol. The PIM serves as the master device of the timing sequence and at appropriately designated sequence slots receives bus command signals from the SIM which map to particular interrupt signals that the PIM forwards to the interrupt controller on the compatibility PCI bus for transportation to the CPUs.

16 Claims, 5 Drawing Sheets

| SEQUENCE SLOT | PIM PIN |
|---|---|
| 0 | SYSTEM ERROR INTERRUPT |
| 1 | SERVER MANAGEMENT INTERRUPT [0] |
| 2 | SERVER MANAGEMENT INTERRUPT [1] |
| 3 | IRQ [3] |
| 4 | IRQ [4] |
| 5 | IRQ [5] |
| 6 | IRQ [6] |
| 7 | IRQ [7] |
| 8 | IRQ [8] |
| 9 | IRQ [9] |
| 10 | IRQ [10] |
| 11 | IRQ [11] |
| 12 | IRQ [12] |
| 13 | IRQ [13] |
| 14 | IRQ [14] |
| 15 | IRQ [15] |

600 — (rows 0–2)
610 — (row 4)

FIG. 6

| SEQUENCE | COMMAND |
|---|---|
| 00 | START |
| 01 | RESERVED |
| 10 | ASSERT |
| 11 | DEASSERT/RELEASE |

720 — (row 10)
740 — (row 11)

FIG. 7

APPARATUS AND METHOD FOR TRANSPORTING INTERRUPTS FROM SECONDARY PCI BUSSES TO A COMPATIBILITY PCI BUS

FIELD OF THE INVENTION

The present invention relates to computer systems. More particularly, the present invention relates to the transportation of interrupt request signals (IRQs). Specifically, the present invention relates to the transportation of IRQs from one or more secondary Peripheral Component Interconnect (PCI) busses to a compatibility PCI bus.

BACKGROUND

In the computer industry, computer systems are usually designed utilizing a multiple bus architecture to provide transportation of signals between various peripheral components and the system's central processing units (CPUs). One type of signal transported in this manner is the interrupt request signal (IRQ) which is used to interrupt the CPU's processing operations to request CPU processing time.

Interrupt signals are commonly represented using the Industry Standard Architecture (ISA) protocol. This sixteen bit protocol defines sixteen distinct IRQs (designated IRQ0–IRQ15) for use by various components within the computer system. Often one or more of the designated IRQs is made available for the computer system's interrupt control device or other peripheral components.

Figure 1:
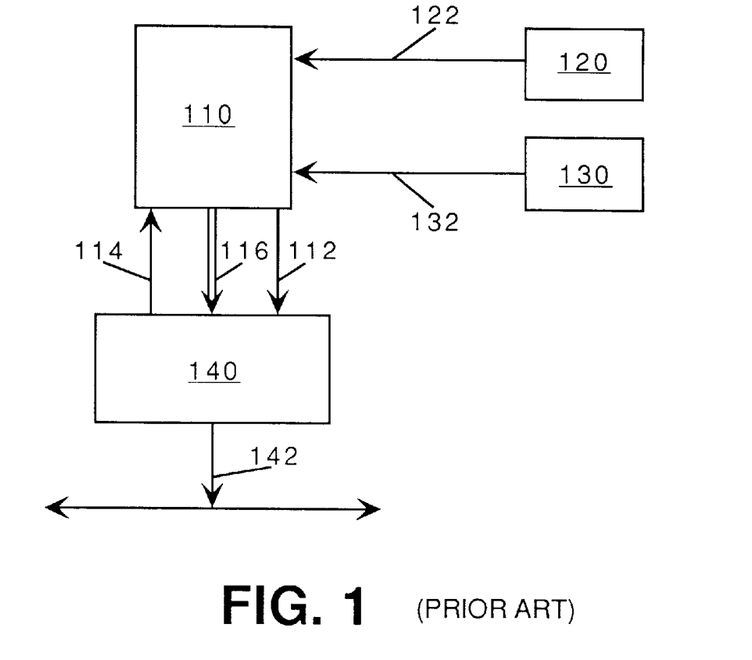
FIG. 1 is a block diagram illustrating transportation of IRQs by an interrupt controller in the prior art.

As illustrated in FIG. 1, an interrupt control device 110 receives IRQs 122 and 132 from other system components, such as peripheral components 120 and 130. Interrupt control device 110 then provides an interrupt signal 112 to the system's CPU 140 indicating the existence of an interrupt. The CPU 140, in response to the interrupt signal 112, acknowledges the interrupt signal 112 by sending an acknowledge cycle 114 to the interrupt control device 110. The interrupt control device 110 responds by sending a code vector 116 to the CPU 140 for execution of the appropriate interrupt service routine (ISR) 142.

Figure 2:
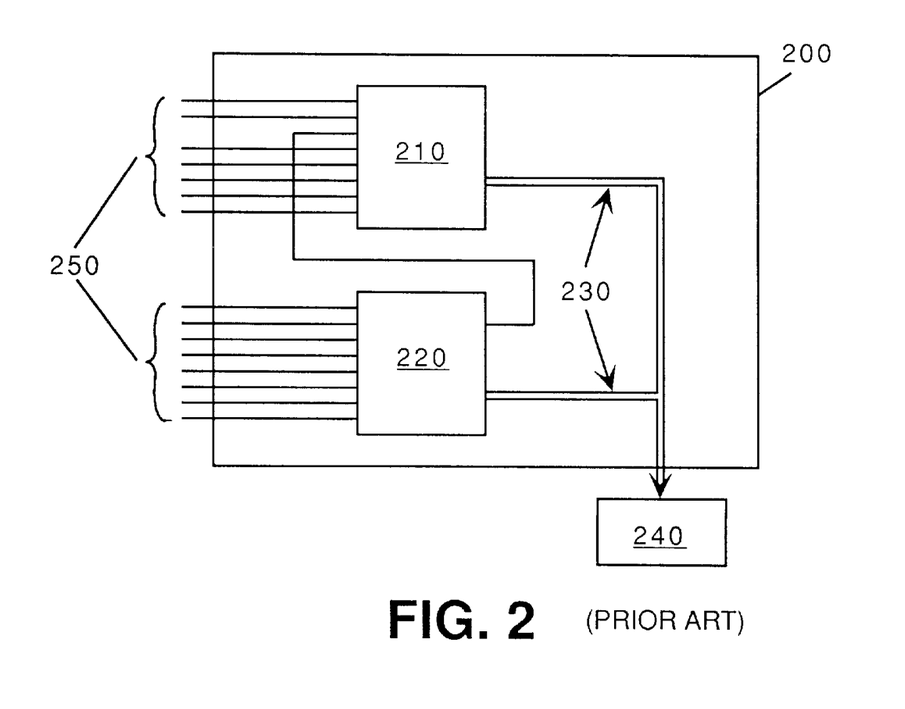
FIG. 2 is a block diagram illustrating an interrupt control device as used in the prior art.

An interrupt control device may include a programmable interrupt controller (PIC) to receive the IRQs. One well known PIC is the Intel 8259 PIC, available from Intel Corp., Santa Clara, Calif., hereafter referred to as the 8259 PIC, which can receive eight distinct interrupt signals from peripheral components. As shown in FIG. 2, interrupt control device 200 has one 8259 PIC 210 cascaded from a second 8259 PIC 220 in order to provide for the fifteen possible IRQ signals 250 of the ISA protocol. The 8259 PICs receive the IRQs 250 and provide appropriate code vectors 230 to the CPU 240.

In some multiple bus architectures, for example Intel x86 architectures, IRQs required for the start up, or boot operation, of the computer system are transported to the CPUs from an interrupt control device located on the compatibility PCI bus. The compatibility PCI bus has its own compatibility PCI bus clock rate and operates under controlled power specifications required by the particular circuitry and components on the compatibility PCI bus.

Figure 3:
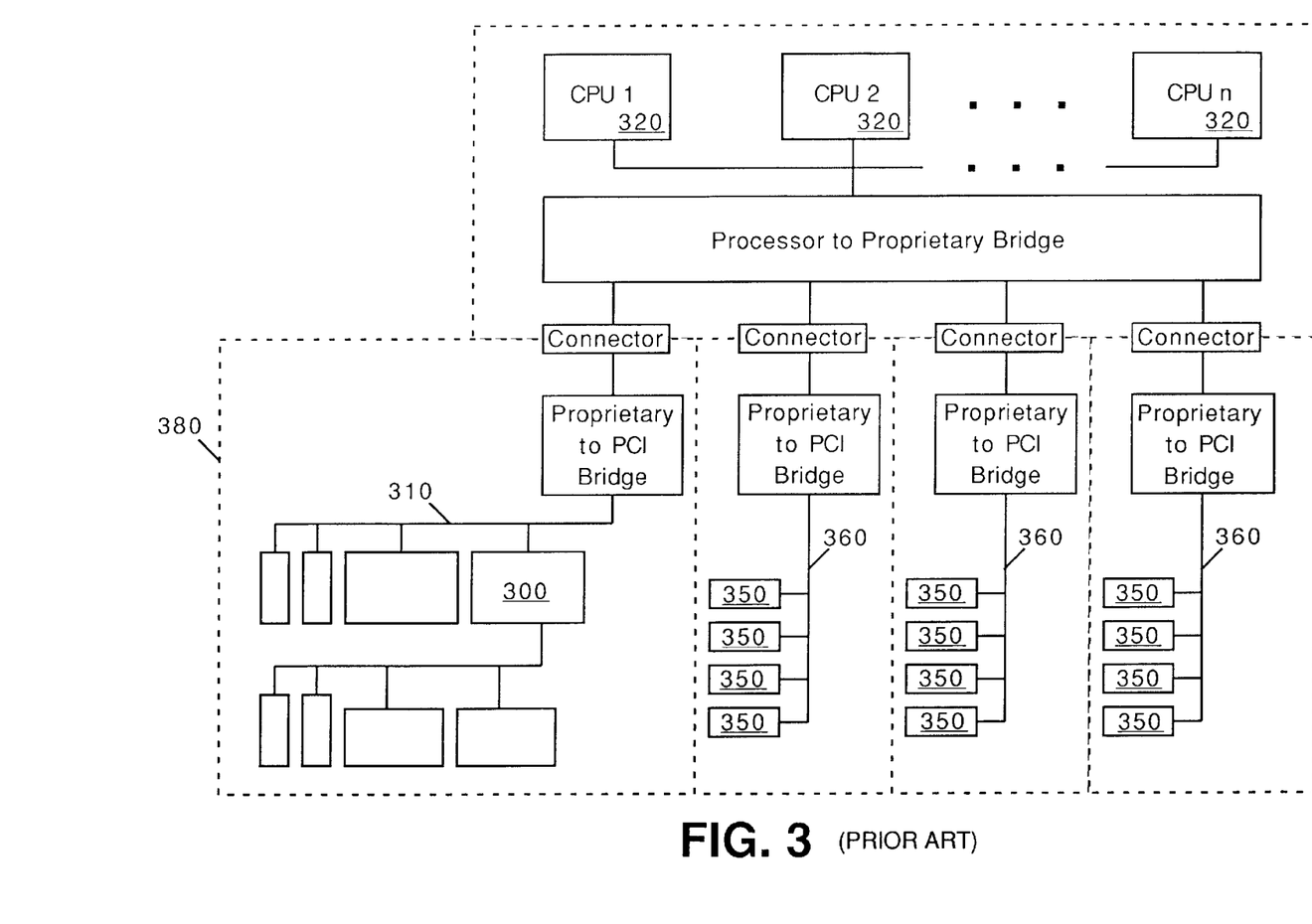
FIG. 3 is a block diagram of one computer system illustrating a architecture having compatibility and secondary PCI bus structures as used in the prior art.

As shown in FIG. 3, the compatibility PCI bus 310 is usually resident in a single, circuited board, called the compatibility module 380, and transports IRQ signals from its various components for forwarding to the CPUs 320. Components that require an interrupt controller to signal their interrupt to the CPUs 320, utilize an interrupt controller 300, such as an 8259 PIC, located on the compatibility PCI bus 310.

In the above architecture, additional peripheral components can be added to the computer system using secondary PCI busses 360 which are currently designed to reside on separate circuitry boards apart from the compatibility PCI bus 310. Secondary PCI busses 360 operate at their own individual PCI clock rates and power requirements which can be very different from the clock rates and power requirements of the compatibility PCI bus 310. During the boot operation, some operating systems require that they boot from 8259 PIC devices, thus it is necessary to transport IRQs from peripheral components 350 on the secondary PCI busses 360 to the interrupt controller 300 located on the compatibility PCI bus 310 for signaling to the CPUs 320.

Currently, the transport of IRQs from each peripheral component 350 on the secondary PCI bus 360 requires four pins per component on the bus. With four components per secondary PCI bus 360, 16 signals per secondary PCI bus 360 need to be routed to the interrupt controller 300 located on the compatibility PCI bus 310. As several secondary PCI busses 360 can be designed in the system, the number of signals that need to be routed to the interrupt controller 300 increases by magnitudes of 16 signals per secondary PCI bus 360.

With the secondary PCI busses 360 separate from the compatibility PCI bus 310, the IRQs from the individual peripheral components 350 must to be routed between the secondary PCI bus 360 and the compatibility module board 380, and then to the interrupt controller 300 on the compatibility PCI bus 310. Signal routing is frequently accomplished using trace wiring on circuitry boards and using pin connectors or cables between circuitry boards. As detailed below, each of these methods can increase the cost and design complexity of a computer system, thus, it is important to route IRQ signals as efficiently and economically as possible.

Trace wiring of a signal on a circuit board, such as the compatibility module board 380, has to be planned and the board fabricated with the desired circuitry, or topology. Trace wiring of signals on a board can be increased by fabricating multiple circuit layers on the board. As circuitry board space is very limited, the more signals that need to be routed, the more circuit layers that may need to be added to the board. Additional circuit layers in the fabrication of a board increases its cost. Using an example of connecting two secondary PCI busses to the compatibility PCI bus, 16 individual signals would need to be trace wired across each secondary PCI bus board to an interconnect to the compatibility module, then the combined 32 individual signals would need to be trace wired across the compatibility module board to the compatibility PCI bus. It is apparent that this routing of multiple signals across the boards utilizes limited board space and increases the complexity of the board topology and would increase board cost, and system cost.

Further, transportation of the individual signals between boards using pin connectors or cable wires increases the cost of a system on a per pin or per cable wire basis. Thus, for example, the connection of two secondary PCI busses to the compatibility bus would require 32 individual IRQ connections using 32 individual pin connectors or cable wires each time the signals were transported between boards. Cable wires, also, have the disadvantage of requiring internal computer space for routing of the cables carrying the individual cable wires which uses up a majority of the limited internal computer design volume.

With current market pressures to produce smaller, more economical systems with increased peripheral component add-on capability, while reducing the cost and size of a computer system, it is apparent that the above alternatives do not present economical routing options. Thus, a need exists for an apparatus and/or method that can transport IRQs from secondary PCI busses to the compatibility PCI bus, that is sensitive to system cost and design complexity as well as PCI bus requirements.

SUMMARY OF THE INVENTION

The present invention presents a novel apparatus and method for transporting IRQs from secondary PCI busses to the compatibility PCI bus.

The apparatus of the present invention provides for a primary programmable interrupt mapping device (primary PID) that is coupled to an interrupt controller on a computer system for transporting IRQs from secondary PCI busses to the CPUs. The primary PID is coupled to at least one secondary PID via an interrupt bus that transports IRQ signals from the secondary PID to the primary PID according to a 2 bit bus protocol and timing sequence. The 2 bit bus protocol is composed of a clock cycle signal and a data signal. The clock cycle signal of the timing sequence is generated by a clock source independent of any PCI bus clock rate and is sent to both the primary and secondary PIDs. The data signal is a bidirectional signal and connects the secondary PID(s) to the primary PID in a wired-"OR" fashion. The secondary PID receives IRQs from peripheral components located on secondary PCI busses and signals the IRQs according to a predetermined bus command during the timing sequence. The primary PID receives the IRQs from the secondary PID(s) and forwards them to the interrupt controller at a compatible clock rate.

The method of the present invention is used to transport interrupt request signals from at least one secondary PID to a primary PID utilizing a 2 bit bus protocol and timing sequence for communication to an interrupt controller. A clock source independent of any PCI bus generates a clock signal to the primary and secondary PIDs. Synchronous to the aforementioned clock signal, a 1 bit bi-directional data signal is transported over a wired-"OR" interrupt bus between the primary PID and at least one secondary PID. The timing sequence contains at least one sequence slot that will designate a particular interrupt. If a secondary PID detects an interrupt signal from a peripheral component, it will signal the presence of the interrupt to the primary PID at the appropriate sequence slot in the timing sequence using the 2 bit bus protocol. At the end of the timing sequence, the primary PID will forward the IRQs to the system interrupt controller in the clock domain of the interrupt controller.

BRIEF DESCRIPTION OF THE DRAWINGS

The present invention is illustrated by way of example, and not by way of limitation, in the figures of the accompanying drawings in which.

DETAILED DESCRIPTION

An apparatus and method are provided for transporting interrupt request signals (IRQs) from one or more secondary PCI busses to the compatibility PCI bus. In this detailed description, one embodiment of the invention is described which utilizes the invention in the context of the boot of a computer system where IRQs are being transported from one or more secondary PCI busses to the interrupt controller on the compatibility PCI bus. It should be understood that this embodiment is for the purpose of illustration and is not provided as a limitation.

Throughout this detailed description, numerous specific details are set forth such as particular signal names, bus protocols and computer architecture types, in order to provide a thorough understanding of the present invention. It will be appreciated by one having ordinary skill in the art that the present invention may be practiced without such specific details. In other instances, well known components, structures and techniques have not been described in detail in order to avoid obscuring the subject matter of the present invention. Particularly, much of the functionality of the present invention is going to be described in terms of timing diagrams to be implemented by various types of logic circuitry. It will be understood by those having ordinary skill in the art that the functionality of the present invention may be implemented by various techniques.

Figure 4:
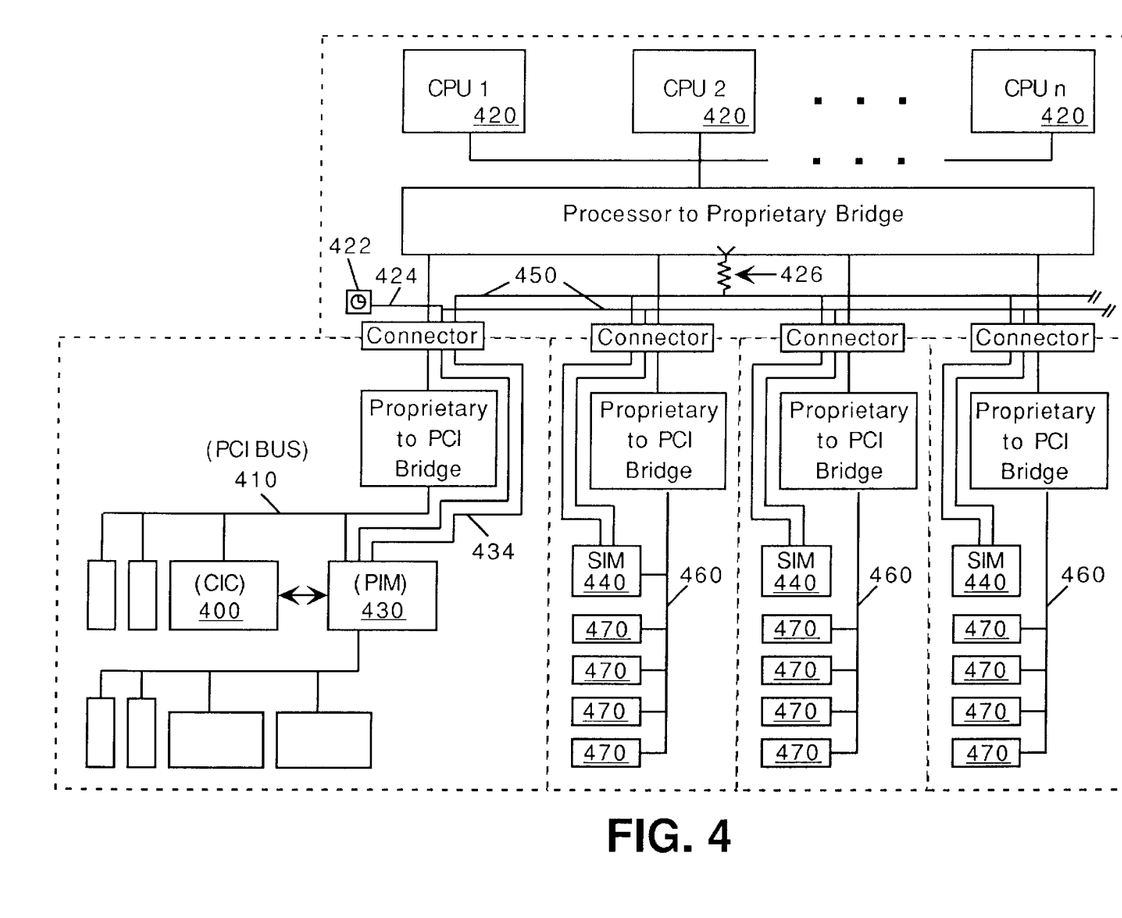
FIG. 4 is a block diagram of one embodiment of the present invention which may be implemented in a computer architecture having compatibility and secondary PCI bus structures.

Referring now to FIG. 4, one example of a computer system architecture which may incorporate the present invention is illustrated. The computer system is illustrated so as to highlight the hierarchical interrupt organization of the architecture. Numerous components of the computer system not affected or involved within the present invention are not shown.

It can be seen that the computer system includes a Compatibility Interrupt Control (CIC) device 400 resident on the compatibility PCI bus 410 coupled to a computer system's central processing units (CPUs) 420. In the present example, the CIC 400 utilizes two cascaded 8259 PICs, as earlier described, to receive fifteen possible IRQ signals. The CIC device 400 then provides an interrupt signal to the CPUs 420. A CPU 420, in response to the interrupt signal, acknowledges the interrupt signal by sending an acknowledge cycle to the CIC 400. The CIC 400 then provides an interrupt code vector for transportation to the CPU 420.

In the present illustration, the CIC 400 receives its IRQ input from the Primary Interrupt Mapping device (PIM) 430 of the present invention. The PIM 430 is further connected to at least one Secondary Interrupt Mapping device (SIM) 440 by a interrupt bus 450 which transports signals between the PIM 430 and SIM(s) 440 according to a timing sequence that utilizes a 2 bit bus protocol. The 2 bit bus protocol is composed of a 1 bit clock cycle signal and a 1 bit data signal which creates a timing sequence for transport of IRQs detected by a SIM 440 on a secondary PCI bus 460 to the PIM 430.

In one embodiment of the present invention, both the PIM 430 and the SIM(s) 440 are programmable interrupt devices (PIDs). A PID has internal clocking and mapping logic that allows it to map input signals to specific output pins for forwarding to other components. A PID can be configured to act as a master of the timing sequence on the interrupt bus 450 or to act as a slave. In the present embodiment, a PID is configured to act as master or slave using a strapping bit. In the present embodiment, the master PID, PIM 430, is strapped high and the slave PIDs, SIMs 440, are strapped low. It is to be understood that the present embodiment is not meant to be restrictive, in that the configuring of the PIDs as master and slave can be accomplished in different manners, so long as the logic of the PIDs is appropriately defined.

In one embodiment of the present invention, the PIM 430 is located on the compatibility PCI bus 410 and serves as the controller, or master, of the timing sequence. The PIM 430 initiates the timing sequences on the interrupt bus 450, monitors SIM 440 inputs, and asserts appropriate IRQs to the CIC 400.

The SIMs 440, in the present embodiment, are located on secondary PCI busses 460 and serve as slave devices to the PIM 430. It is to be understood while only one SIM 440 is required for the present invention to be operable, additional SIMs 440 can be added. If additional SIMs 440 are added to the bus 450, they are connected in a wired-"OR" fashion such that if any one SIM 440 signals an interrupt during the timing sequence, the interrupt is transported to the PIM 430. The SIMs 440 detect interrupt signals from peripheral components 470 on the secondary PCI busses 460 and transport the signals to the PIM 430 on the data signal 434 of the bus 450 according to the timing sequence and 2 bit bus protocol using bus commands. The bus protocol is described in greater detail below, and an example of such a protocol is illustrated in FIGS. 4, 5, 6 and 7.

The compatibility interrupt bus 450 is used to transport IRQs from the SIMs 440 to the PIM 430 utilizing the 2 bit compatibility bus protocol that forms the timing sequence. It is composed of a clock signal 424 and a data signal 434 and interconnects the SIMs 440 to the PIM 430. The SIMs 440 and PIM 430 share a common clock signal 424 which is generated by a clock source 422, for example, an oscillator or clock synthesizer. In one embodiment of the present invention, the clock rate of the clock source 422 is independent of the clock rates on the compatibility PCI bus 410 and the secondary PCI busses 460. In one embodiment of the present invention, the data signal 434 of the bus 450 is biased high, electrical value 1, utilizing a pull-up resistor 426.

Figure 5:
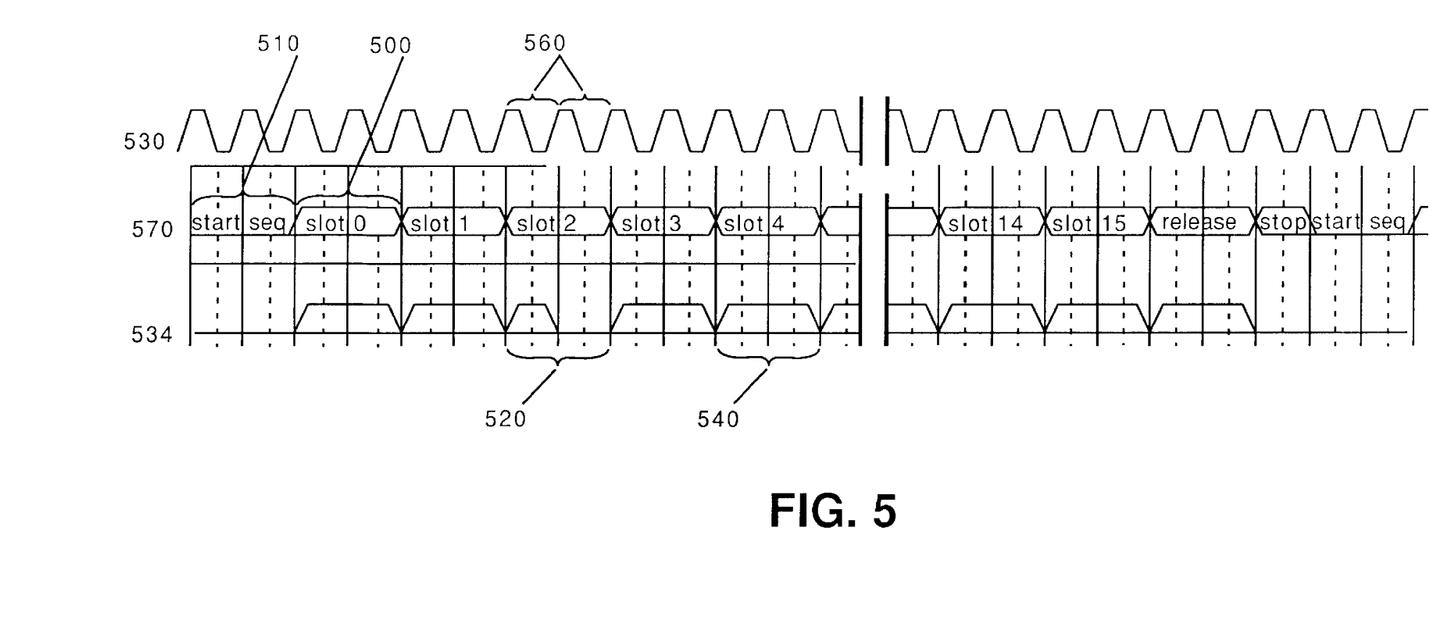
FIG. 5 is one example of a timing diagram illustrating various interrupt signaling utilizing the bus protocol of one embodiment of the present invention.

In order to explain the 2 bit compatibility bus protocol and timing sequence, an example as illustrated in FIG. 5 is used. It should be noted that this example is used merely to be illustrative and is not meant to limit the present invention in any way.

Referring to FIG. 5, in one embodiment of the invention, there is shown a timing sequence utilized by the present invention to transport IRQs from the SIMs 440 to the PIM 430 utilizing the 2 bit compatibility bus protocol. The timing sequence is a series of at least one sequence slot 500. In one embodiment, each sequence slot 500 is composed of two clock cycles 560, however other clock cycle counts can be used. In this example, the timing sequence is a series of 16 sequence slots (slots 0–15) where each sequence slot can be assigned to represent a particular IRQ. It should be noted that although 16 sequences are described herein, any number of sequences may be chosen depending upon the number of interrupt signals necessary for the particular computer system.

Figure 6:
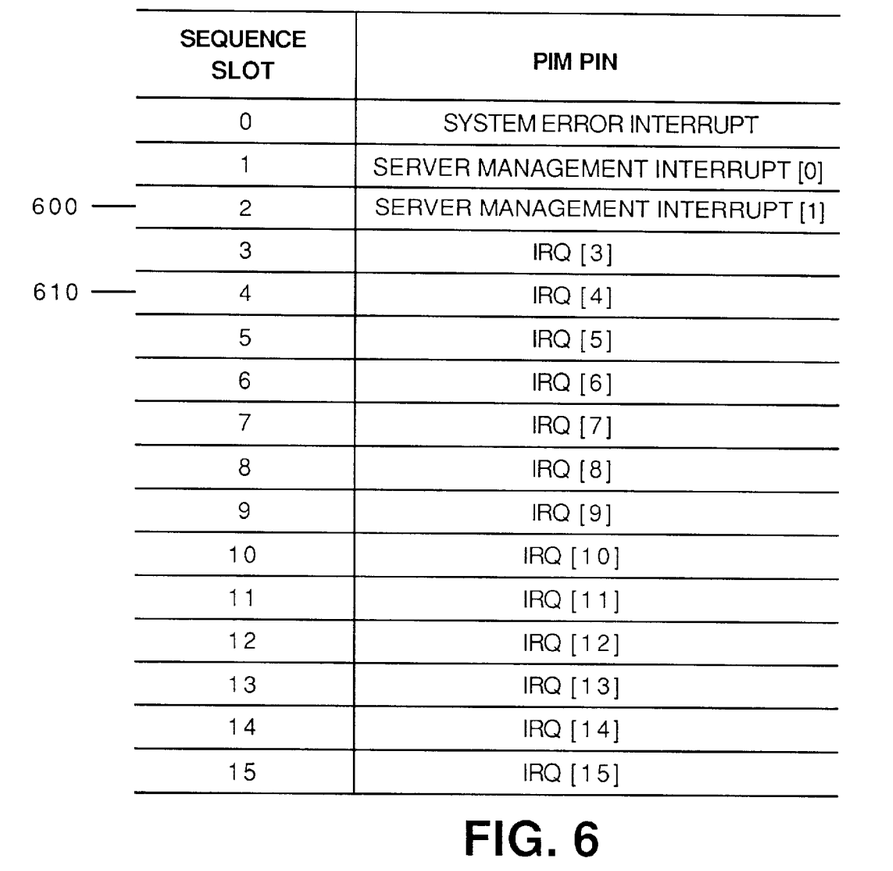
FIG. 6 is one example illustrating how interrupt signals transported according to the present invention can be designated to a specific pin connection on the PIM for transport to the interrupt control device on the compatibility PCI bus.

FIG. 6 illustrates one example of how the particular sequence slots of the timing sequence, as illustrated in FIG. 5, can be assigned to represent a particular interrupt signal for corresponding to a particular output pin on the PIM 430 for transportation to the CIC 400. In one embodiment of the present invention, the PIM 430 is hardwired with the mapping logic, however, in other embodiments, the PIM 430 may be configured differently. At reference numeral 600 it is illustrated that a SIM 440 interrupt signal received during sequence slot 2 of the timing sequence will be designated to the PIM 430 output pin for signaling a server manager interrupt to the CIC 400. As another example, at reference numeral 610, it is illustrated that a SIM 440 interrupt given during sequence slot 4 of the timing sequence corresponds to the PIM 430 output pin for signaling the IRQ4 interrupt to the CIC 400.

Referring again to FIGS. 4 and 5, at the power on of the computer system, the clock source 422 generates the clock cycle signal 424 and the PIM 430 generates the data signal 434 creating the timing sequence. In the present embodiment, the PIM 430 data signal 434 on the bus is pulled high, electrical value 1, utilizing the resistor 426. As shown at reference number 510, the PIM 430 signals the start of the timing sequence to the SIMs 440 by driving the data signal 534 low for 2 clock cycles. Immediately following the start sequence, the PIM 430 monitors the next 16 sequences for signals from the SIMs 440 according to the bus commands shown in FIG. 7.

Figure 7:
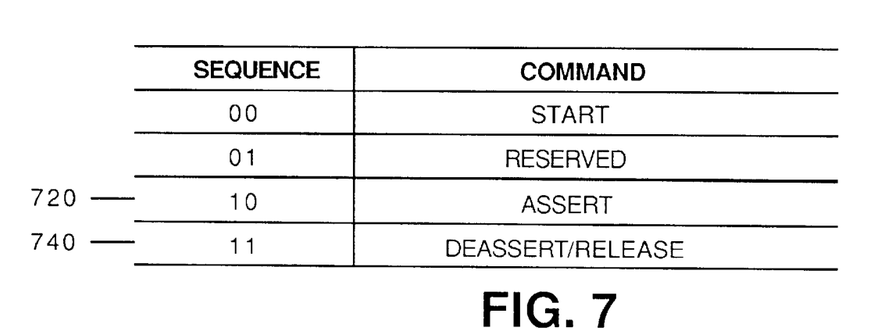
FIG. 7 is a table that illustrates one example of bus command signal protocol utilized on the interrupt bus of the present invention.

Referring to FIG. 7, a bus command is a sequence of data signals that correspond to a pair of clock cycles. Following the start sequence, the bus data signal will resume its high level, electrical value 1, unless a SIM 440 signals an interrupt on the bus. For example, if a SIM 440 was to signal an interrupt, referring to reference numeral 720, it would signal the assert command on the data signal to the PIM 430. Thus, on the second clock cycle of the particular interrupt sequence slot, the SIM 440 would drive the data signal low, electrical value 0. This would indicate to the PIM 430 that an interrupt signal was present during that particular sequence slot and the PIM 430 would set its output pin to signal that particular interrupt as earlier illustrated with FIG. 6. As another example, if no interrupt signal was to be signaled, according to reference numeral 740, the deassert command is recognized if the data signal remains high for both clock cycles. Thus the SIM 440 effectively has no input. This would indicate to the PIM 430 that no interrupt signal was present during a specific sequence slot. It is to be noted that other bus command sequences can be used so long as the mapping logics of the PIM 430 and SIMs 440 are configured to accommodate the particular arrangement.

Referring again to FIG. 5, in one example as illustrated by reference numeral 520, if a SIM 440 asserts an IRQ during sequence slot 2, the SIM 440 drives the data signal low for the second clock cycle of the sequence. This sequence informs the PIM 430 that the interrupt associated with the current sequence slot needs service and the PIM 430 will set the corresponding output pin. Alternatively, as illustrated by reference numeral 540, if no interrupt is present, the data signal remains high for both clock cycles. This sequence informs the PIM 430 that the interrupt associated with the current sequence slot does not need service.

Upon receipt of an assert signal, the PIM 430 sets the output pins, as previously described and shown in FIG. 6. After completion of the 16th sequence slot, i.e., slot 15 of the present example, the release sequence is entered and all the devices on the bus resume the stop state. The release sequence is entered when the PIM 430 and SIMs 440 do not send signals down the interrupt bus 450. The PIM 430 then transports the designated interrupts to the CIC 400 for communication to the CPUs 420. In transporting the designated interrupts, the PIM 430 logic provides the signals to the CIC 400 at the clock rate of the compatibility PCI bus 410. It should be noted that it is not important in the present invention that the CIC 400 or PIM 430 knows from which secondary component the IRQ is coming from. It is only necessary to know that a particular interrupt should be transported to the CIC 400. Following the release sequence, the PIM 430 starts the next timing sequence. In this way, IRQs can be transported utilizing the bus protocol and timing sequence on a 2 bit bus rather than on 16 separate parallel signals.

It is apparent from the above description that utilizing the present invention provides advantages over the previous architectures. First, IRQs are transported from the secondary PCI busses to the compatibility PCI bus utilizing only 2 signals rather than 16 signals, reducing costs associated with pin connections and the associated routing and design complexities. Additionally, IRQs are transported from the secondary PCI busses to the compatibility PCI bus using a clock source that independent of both PCI bus rate and power requirements. This allows the clock source of the present invention to have the flexibility to accommodate the particular system requirements of the different secondary PCI busses without being limited by an existing PCI clock or power restriction.

In one embodiment, the present invention is utilized to transport IRQs from secondary PCI busses to the compatibility PCI bus during the boot of a computer system. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
  a system interrupt controller;
  a primary programmable interrupt mapping device (primary PID) coupled to said system interrupt controller; and,
  at least one secondary programmable interrupt mapping device (secondary PID) coupled to said primary PID by an interrupt bus, wherein said interrupt bus has a 2 bit bus protocol,
    a first bit for transporting a clock cycle generated by an independent clock source, and
    a second bit for transporting a data signal between said at least one secondary PID and said primary PID wherein said data signal transported during a particular clock cycle indicates to said primary PID that an interrupt has occurred.

2. The apparatus of claim 1 wherein said primary PID is coupled to said system interrupt controller for transportation of a plurality of interrupt request signals signaled by said at least one secondary PID on said interrupt bus according to said 2 bit bus protocol.

3. The apparatus of claim 2 wherein said secondary PID is coupled to said primary PID for transportation of interrupt request signals detected on at least one secondary peripheral component interconnect (PCI) bus, wherein said interrupt request signals are transported from said secondary PID to said primary PID over said interrupt bus utilizing a plurality of bus commands according to said 2 bit bus protocol.

4. The apparatus of claim 3 wherein said independent clock source is a dedicated clock source common to said primary PID and said secondary PID.

5. The apparatus of claim 3 wherein said interrupt bus connects more than at least one secondary PID to said primary PID in a wired-OR arrangement.

6. The apparatus of claim 3 wherein said data signal is generated synchronous to said clock cycle to form a timing sequence wherein said timing sequence contains at least one sequence slot.

7. The apparatus of claim 6 wherein said sequence slot contains at least a first clock cycle directly followed by a second clock cycle.

8. The apparatus of claim 3 wherein said primary PID contains logic for mapping interrupt request signals signaled on said interrupt bus to output pins on said primary PID for transportation of said interrupt request signals to said system interrupt controller.

9. The apparatus of claim 8 wherein said primary PID transports said interrupt request signals to said system interrupt controller according to timing requirements of said system interrupt controller.

10. The apparatus of claim 8 wherein said secondary PID contains logic for mapping interrupt request signals detected on said secondary PCI busses for transportation to said primary PID over said interrupt bus.

11. A method for transporting interrupt request signals from at least one secondary PID to a primary PID comprising:
  generating an independent clock signal by a clock source;
  generating a data signal synchronous to said clock signal to form a timing sequence wherein said timing sequence contains at least one sequence slot;
  transporting said timing sequence to said at least one secondary PID;
  generating a bus command in response to said sequence slot at said at least one secondary PID; and,
  transporting said bus command on said data signal to said primary PID wherein said bus command generated during a particular sequence slot of said timing sequence indicates to said primary PID whether a particular interrupt is present or is not present.

12. The method of claim 11 wherein said at least one sequence slot contains at least a first clock cycle directly followed by a second clock cycle.

13. The method of claim 12 wherein said bus command further comprises a series of at least a first bus command signal directly followed by a second bus command signal further wherein said first bus command signal is transported to said primary PID in the first clock cycle of said sequence slot, and said second bus command signal is transported to said primary PID in the second clock cycle of said sequence slot.

14. An apparatus for transporting interrupt request signals from at least one secondary programmable interrupt mapping device (secondary PID) to a primary programmable interrupt mapping device (primary PID) comprising:
  means for generating an independent clock signal;
  means for generating a data signal synchronous to said clock signal to form a timing sequence wherein said timing sequence contains at least one sequence slot;
  means for transporting said timing sequence to said at least one secondary PID;

means for generating a bus command in response to said sequence slot at said at least one secondary PID; and means for transporting said bus command on said data signal to said primary PID wherein said bus command generated during a particular sequence slot of said timing sequence indicates to said primary PID whether a particular interrupt is present or is not present.

15. The apparatus of claim 14 wherein said bus command generated in response to said sequence slot indicates to said primary PID the presence of an interrupt.

16. The apparatus of claim 14 wherein said bus command generated in response to said sequence slot indicates to said primary PID the absence of an interrupt.

* * * * *